Feb. 14, 1967 R. K. JONES 3,303,950
LOAD TRANSPORT VEHICLE
Filed Dec. 29, 1964 2 Sheets-Sheet 1
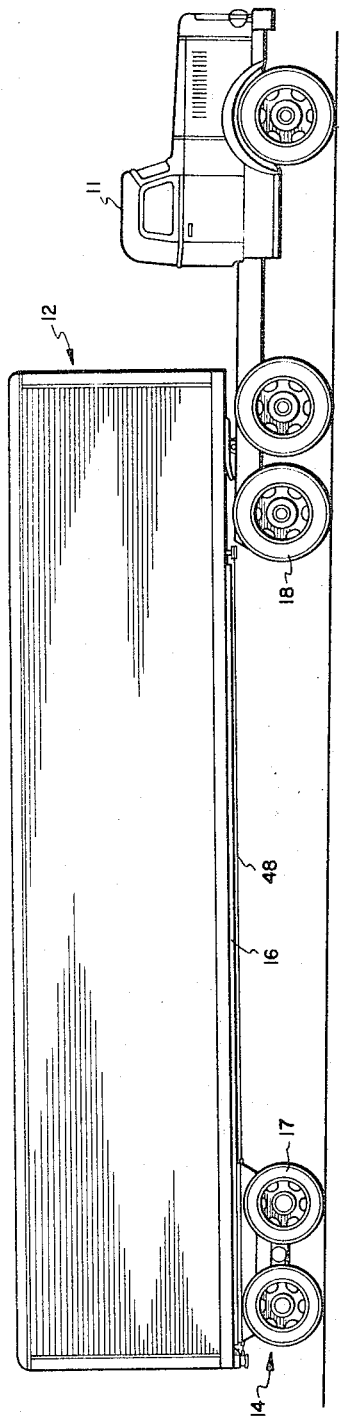
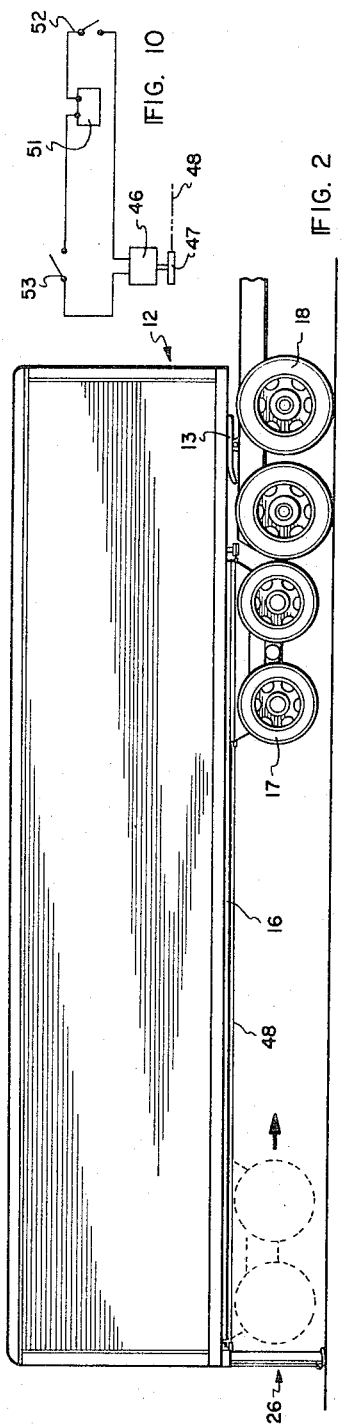
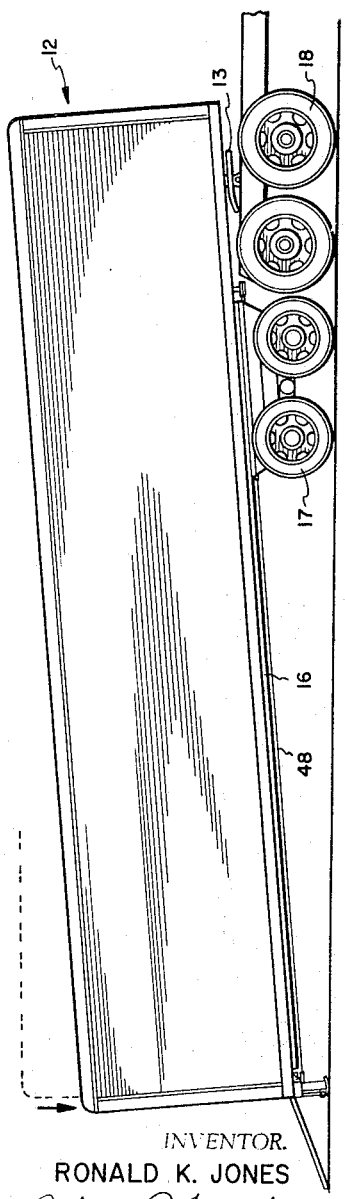
INVENTOR.
RONALD K. JONES
BY Robert R. Finch
ATTORNEY

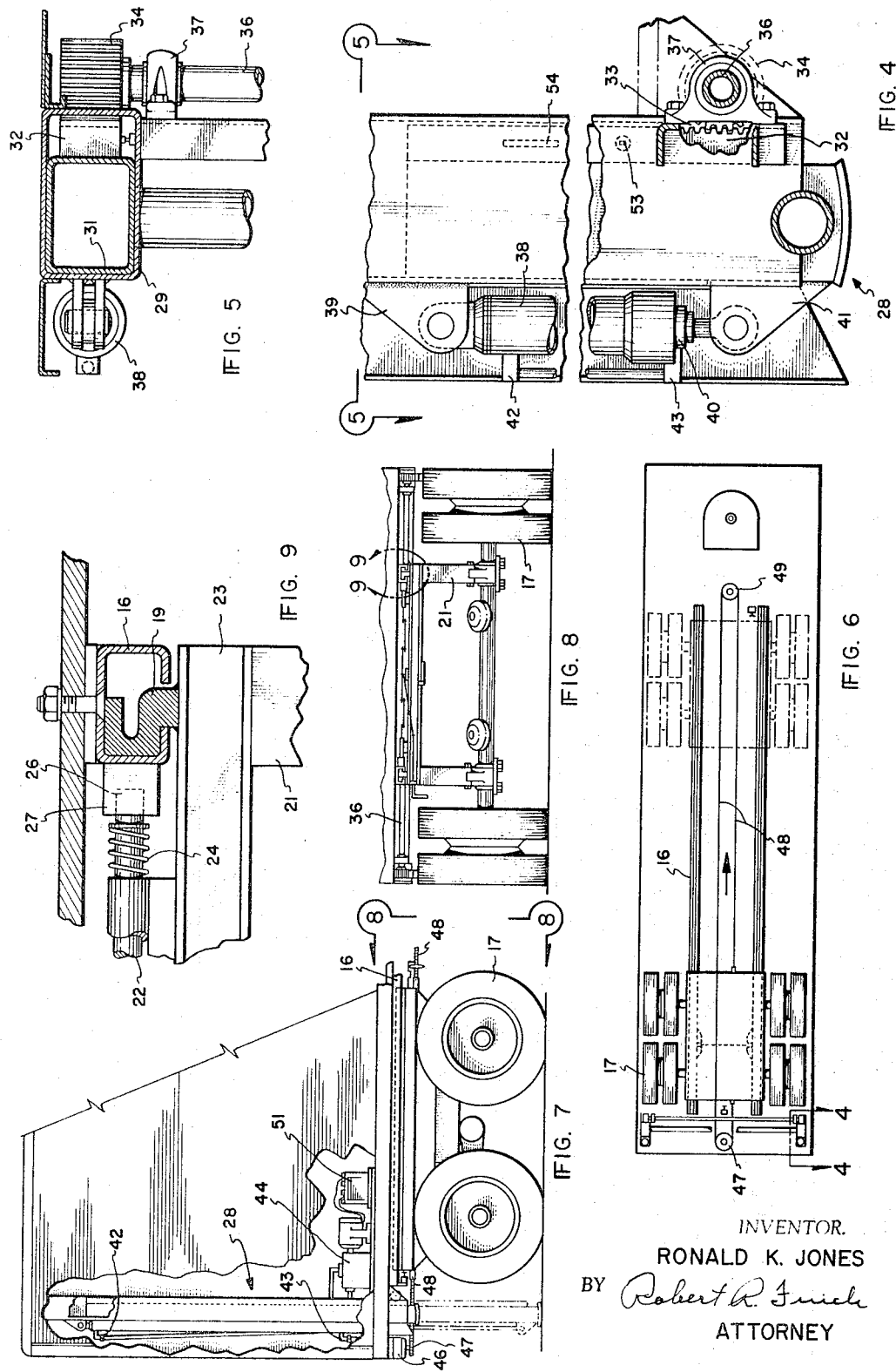

United States Patent Office 3,303,950
Patented Feb. 14, 1967

3,303,950
LOAD TRANSPORT VEHICLE
Ronald K. Jones, 1884 West 14400 South,
Riverton, Utah 84065
Filed Dec. 29, 1964, Ser. No. 421,894
4 Claims. (Cl. 214—505)

This invention relates generally to transport vehicles such as semi-trailers and in particular to an improved construction thereof facilitating loading and unloading.

It is the primary object of this invention to provide a trailer construction having means for varying the height of the loading entry to accommodate a wide range of loading dock heights.

A further object is the provision of a semi-trailer of a structure attaining the foregoing primary object and of a construction such that raising and lowering of the loading end of the trailer may be effected while the trailer is still affixed to the fifth wheel of the tractor serving as the prime mover.

A related object is the provision of means preventing inadvertent change of position of the trailer wheels during normal road operation.

In order that the invention may be better understood and carried into effect, reference is made to the accompanying drawings and the description thereof which are offered by way of example only and not in limitation of the invention the scope of which is defined by the appended claims rather than by any preceding description.

In the drawings:

FIG. 1 is a side-elevational view of the tractor and semi-trailer embodying the invention.

FIG. 2 is a view of the structure of FIG. 1, but with the rear of the trailer supported by a jack and the trailer wheel assembly moved forward preparatory to lowering of the rear of the trailer. In FIG. 2, broken lines are used to illustrate normal location of the rear trailer wheels.

FIG. 3 is a view of the trailer of FIGS. 1 and 2 but with the rear of the trailer lowered for loading and unloading at ground level.

FIG. 4 is a partial side elevational view of the jack structure employed in the truck-trailer structure of FIGS. 1–3, the view being taken in the plane of lines 4—4 of FIG. 6. The jack is located in the trailer as illustrated in FIGS. 1 and 6 and in the cut-away portion of FIG. 7. In FIG. 4, certain portions are cut-away to illustrate interior details and the figure is broken to save space.

FIG. 5 is a top view of the jack of FIG. 4 taken in the plane of and looking in the direction of arrows 5—5 of FIG. 4.

FIG. 6 is a bottom elevational view of the trailer of FIGS. 1–3, phantom lines being employed to show hidden parts and to indicate an alternate position of the trailer wheels.

FIG. 7 is a side view, partially cut-away, of the rear portion of the trailer of FIGS. 1–3.

FIG. 8 is a view taken as looking in the direction of arrows 8—8 of FIG. 7.

FIG. 9 is an enlarged view of that part of the trailer wheel mounting assembly encompassed within dotted line 9—9 of FIG. 8.

FIG. 10 is a simple circuit diagram illustrating a preferred embodiment of the circuitry employed to effect position change of the trailer wheels for enabling lowering of the trailer for loading and unloading and for blocking such position change except when the trailer supporting jacks are extended.

As shown generally in FIGS. 1–3, the illustrated embodiment comprises a tractor 11 and a semitrailer 12 connected thereto by a suitable fifth wheel 13 as is usual for towing and support of the front end of the trailer during towing. The rear end of the trailer is supported and carried by a ground engaging wheel assembly 14 which, in accordance with the invention, is mounted to be movable longitudinally of the trailer in tracks 16 as illustrated in FIGS. 2, 3 and 6 and more particularly described hereinafter. As is usual, the trailer is loaded and unloaded through doorways in the back end.

It is an important feature of this invention that lowering of the rear of the trailer may be accomplished while the trailer is still secured to the tractor. In order to accomplish this the wheels 17 on the trailer wheel assembly are of slightly smaller diameter than the rear wheels 18 of the tractor so that when the wheel assembly 14 is moved forward on the tracks from a load carrying position to an inoperative position, as in FIGS. 2 and 3, the bottoms of the trailer wheels are above the bottoms of the tractor wheels and thus spaced above the ground whereby the trailer may be inclined downwardly over the trailer wheels while remaining connected to the fifth wheel, the tilting movement being permitted by the normal construction of the fifth wheel. If it is desired to use larger trailer wheels, then the longitudinal tracks may be formed with an elevated portion at the front to raise the trailer wheels above the tractor wheels when the trailer wheels are in the forward position thereby to permit the trailer to tilt downwardly without interference from the trailer wheels. In this same connection, if smaller trailer wheels are used but it is desired to maintain the trailer level, the tracks may have a downwardly inclined rear section. Tilting of the trailer over the wheel assembly could be provided for by spreading the wheels outside the trailer body or making cutouts in the trailer to receive the wheels, but these arrangements have obvious disadvantages and do not possess the general utility and efficiency of the preferred modifications of the invention as set forth in this specification.

As previously noted, the entire trailer truck or wheel assembly is mounted to move longitudinally of the trailer. This is accomplished by means of the pair of elongated tracks or hanger guides 16 secured to the underside of the trailer and extending longitudinally thereof in parallel spaced-apart relationship; and by the complemental track engaging means or hangers 19 on the upper cross member 23 connecting the main side brackets 21 of the trailer wheel assembly 14 which are slidingly received by the tracks. The trailer wheel assembly is secured in operative position, as in FIGS. 1, 6 and 7, by means of a latch pin 22 on the upper cross member 23. The pin is biased outwardly by a spring 24 to enter into a mating notch 26 in a block 27 on the inner side of the longitudinal track.

To move the trailer wheel assembly back and forth along the track, it is necessary to first take the weight off the wheels; and this is accomplished by the jack arrangement illustrated in FIGS. 2–7. There being one jack on each side of the trailer. As shown, each jack, generally designated 28, is a downwardly extensible structure comprising a primary box beam 29 mounted vertically on the side of the trailer adjacent the rear. For cleanliness of design and ease of service the beam 29 is located inside the trailer. Inside the primary box beam 29 is a second elongated box beam 31 having a rack 32 secured thereto completely along one side. A cutout or window 33 in the wall of the primary beam is provided to permit side entry of a pinion 34 for engagement with the rack. To insure even lifting of the trailer the two jacks are operatively connected to each other by means of the pinions 34 which are keyed to opposite ends of a shaft 36 running transversely of the trailer and journalled for rotation in bearings 37 which are secured adjacent the windows 33 in the primary beams.

Extension of each jack to ground engaging position and retraction therefrom is effected by a hydraulic ram comprising a cylinder 38 secured at one end to a bracket 39 mounted on an upper portion of the outer wall of the main box beam 29 and having a piston 40 the free end of which is secured by a bracket 41 to a lower end portion of the second or extensible box beam 31. The ram is powered in known manner by pressured fluid which may be supplied via conduits 42 and 43 from the battery driven reversible motor and hydraulic pump unit 44. The pump is operated in known manner by a suitable switch (not shown) enabling selection of forward, reverse and off positions and the valving is desirable such that the piston locks in position whenever power is off thus holding the trailer in a selected elevation for loading and unloading. If desired, a loading ramp may be used as shown in FIG. 3.

To move the trailer wheel assembly 14 to the forward position, the jack is first extended as in FIGS. 2 and 7 and extension is continued until the extended portion of the jack reaches below the wheels 17 whereby the wheels are lifted from the ground. When the wheels are thus freed from weight, the latch pin 22 is disengaged from the notch 26, and a reversible motor 46 is turned on either from the cab or other convenient location thereby rotating the sprocket 47 secured on the motor shaft to thus drive the sprocket chain 48 which runs lengthwise of the trailer between the driven sprocket 47 at the rear and an idler sprocket 49 adjacent the front of the trailer. As shown, the motor is operatively connected to the wheel assembly for pulling it back and forth along the tracks by the chain, one end of which is secured to the front of the trailer wheel assembly thence is trained about sprockets 49 and 47 and the other end fastens to the rear of the wheel assembly.

In order to further insure against accidental movement of the trailer wheel assembly a safety arrangement is provided to maintain the circuit controlling the motor 46 in an open position at all times except when the jacks are extended sufficiently (as in FIG. 2) to raise the rear wheels off the ground.

As illustrated in FIG. 10, the circuitry for controlling the chain drive motor 46 is relatively simple and comprises a power source, such as battery 51, and a main on-off control switch 52. Additionally, there is provided a normally open on-off switch 53 which must be closed in order to operate the chain drive motor 46.

The normally open switch 53 is mounted on the inside wall of the main box beam adjacent the rack; and the rack is provided with an elongated cam 54 mounted on an upper portion thereof at an elevation such that it engages and closes the switch 53 only when the jack has extended sufficiently to raise the rear wheels from the ground.

Although the jacks are illustrated as being hydraulically powered, screw type jacks may also be employed with suitable modifications. Similarly, an elongated screw and threaded bore may be employed to move the trailer wheel assembly in lieu of the flexible draft means.

From the foregoing it is obvious that the present invention presents a novel load transport vehicle possessing a high degree of versatility due to its ability while still secured to the tractor to adjust the elevation of its loading entry to accommodate docks of varying heights between ground level and maximum jack elevation.

I claim:

1. A load transport vehicle, comprising a semitrailer supported at its front end by connection to a wheeled prime mover, a ground engaging wheel assembly supporting the rear of said semitrailer; means mounting said wheel assembly under said semitrailer for longitudinal movement relative thereto between a load carrying rear position and a forward inoperative position in which the bottom of its wheels are spaced above the bottoms of the wheels of said prime mover, said means comprising tracks extending longitudinally of and under said semitrailer and complemental hangers mounted on said wheel assembly and in engagement with said tracks; extensible jack means mounted on said semitrailer adjacent its rear and of extended length sufficient to reach below the bottoms of the wheels of said wheel assembly; means for extending said jack to elevate said wheels off the ground; means for pulling said elevated wheels along said track to said forward inoperative position; and means for retracting said jack to lower the rear of said trailer toward the ground whereby the bed of said trailer forms an incline ramp extending downwardly from said prime mover over said wheels toward the ground.

2. A load transport vehicle comprising a semitrailer supported at the front and having a ground engaging wheel assembly for supporting the rear end thereof; means mounting said wheel assembly under said trailer for longitudinal movement relative thereto between a load carrying position at the rear of said semitrailer and an inoperative position spaced above the ground adjacent the front of said semitrailer, said means comprising tracks under said semitrailer extending longitudinally thereof and hanger means on said wheel assembly slidably engaged in said tracks; motor driven means operatively connected to said wheel assembly for pulling it back and forth along said tracks; downwardly extensible jack means mounted on said trailer adjacent the rear thereof and of extended length sufficient to reach below the bottoms of the wheels of said wheel assembly; and normally open on-off switch means for energizing said motor driven means, said switch means being moved between the on and off position in response to extension of said jack means.

3. A load transport vehicle comprising a semitrailer supported at the front and having a ground engaging wheel assembly for supporting the rear end thereof; means mounting said wheel assembly under said trailer for longitudinal movement relative thereto between a load carrying position at the rear of said semitrailer and an inoperative position spaced above the ground adjacent the front of said semitrailer, said means comprising tracks under said semitrailer extending longitudinally thereof and hanger means on said wheel assembly slidingly engaged in said tracks; motor driven means operatively connected to said wheel assembly for pulling it back and forth along said tracks; downwardly extensible jack means mounted on said trailer adjacent the rear thereof and of extended length sufficient to reach below the bottoms of the wheels of said wheel assembly; normally open on-off switch means for energizing said motor driven means, and means on the extensible portion of said jack means for closing said switch means only when said jack is extended to reach below the bottom of said wheels of said wheel assembly.

4. A load transport vehicle according to claim 3 in which said semitrailer is supported on the fifth wheel of a tractor, and the wheels of said wheel assembly of said semitrailer are of a smaller diameter than the rear wheels of said tractor.

References Cited by the Examiner

UNITED STATES PATENTS

| | | | |
|---|---|---|---|
| 2,751,234 | 6/1956 | Couse | 214—515 X |
| 2,986,408 | 5/1961 | Black | 214—515 X |
| 3,083,852 | 4/1963 | Lindstrom | 214—515 |

GERALD M. FORLENZA, *Primary Examiner.*

ALBERT J. MAKAY, *Examiner.*